Jan. 29, 1963  H. E. WAGNER ET AL  3,075,453
COFFEE BREWER
Filed Aug. 22, 1958  4 Sheets-Sheet 1

INVENTORS.
Herbert E. Wagner
Harvey R. Karlen
David C. Eisendrath
By Schnaidt, Hofgren,
Brady & Wegner  Attys

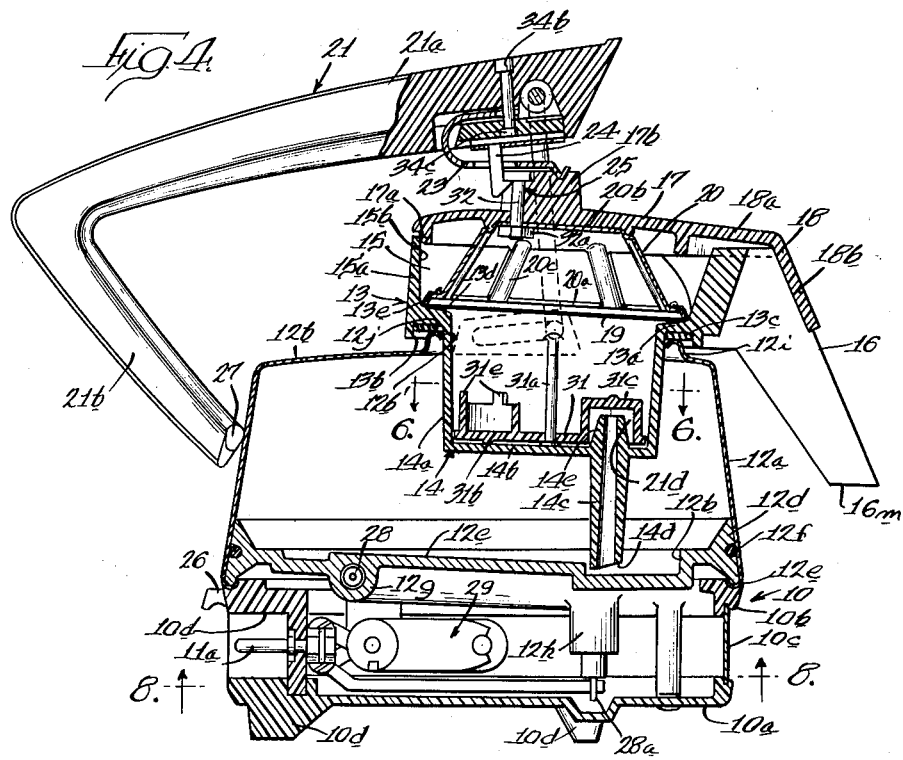

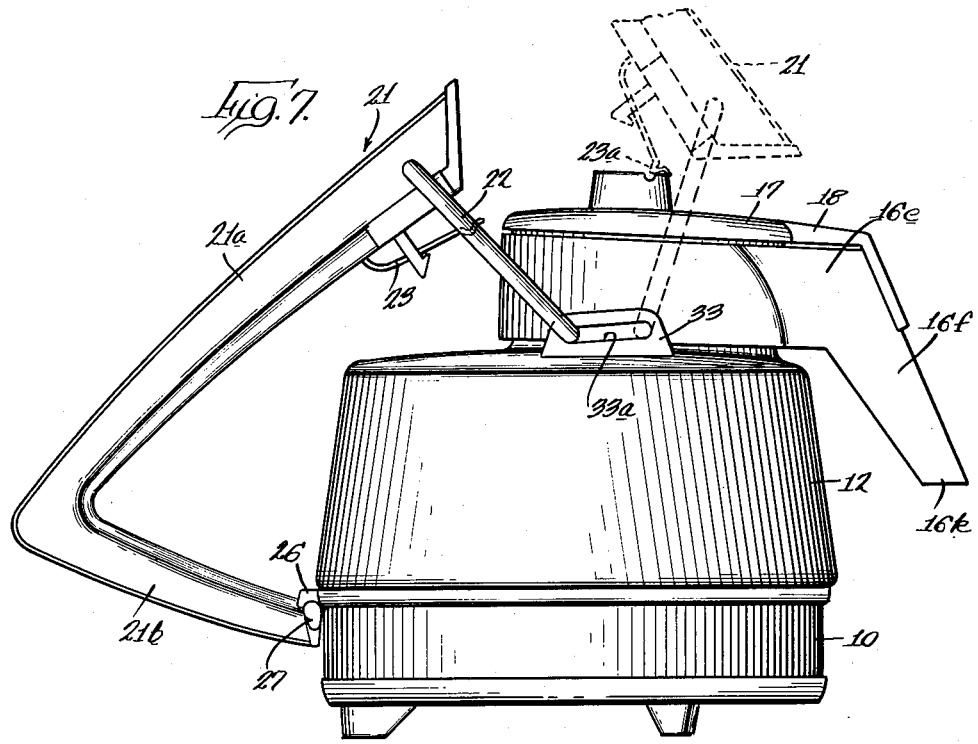
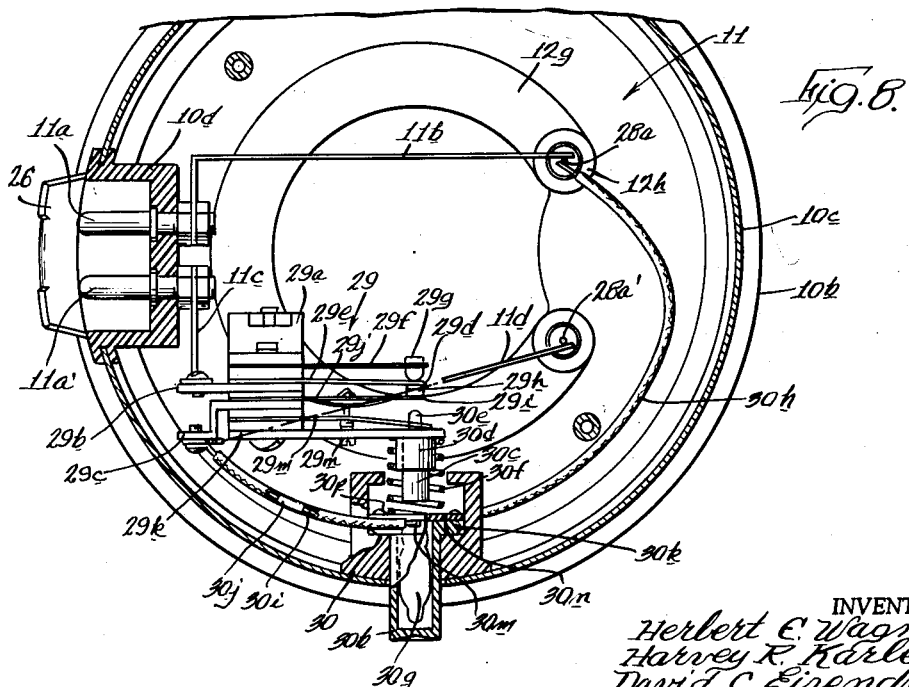

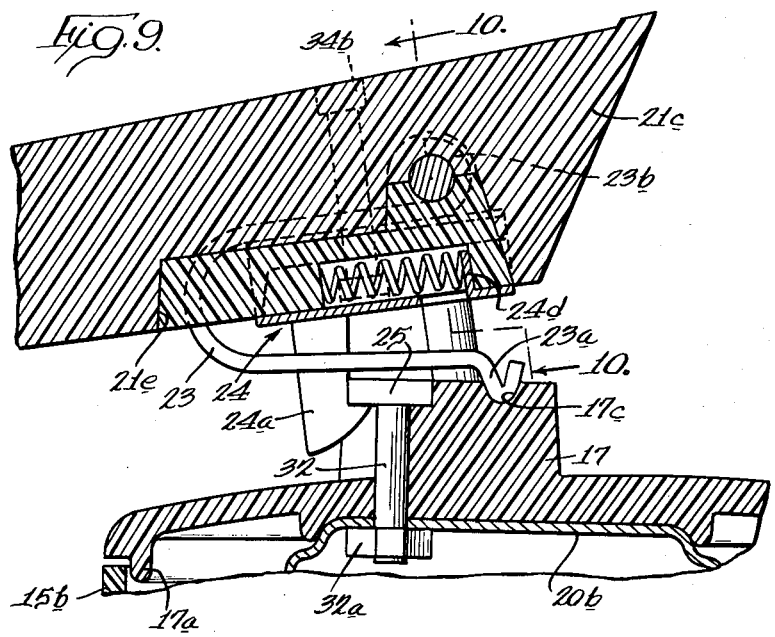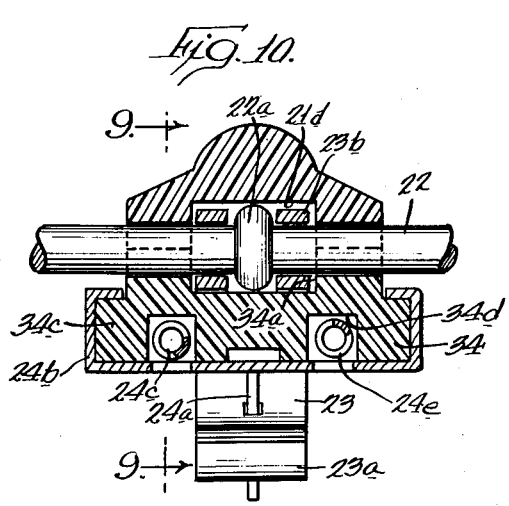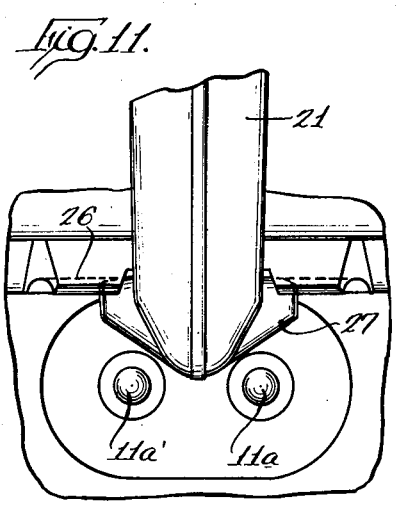

United States Patent Office 3,075,453
Patented Jan. 29, 1963

3,075,453
COFFEE BREWER
Herbert E. Wagner, Harvey R. Karlen, and David C. Eisendrath, Chicago, Ill., assignors to Cory Corporation, a corporation of Delaware
Filed Aug. 22, 1958, Ser. No. 756,698
8 Claims. (Cl. 99—285)

This invention relates to beverage preparing means and in particular to an automatic coffee brewer.

The conventional automatic coffee brewer for home use is one arranged to brew a relatively substantial quantity of coffee such as six or more cups. While it is possible to use such brewers to brew only one or two cups of coffee at a time, it is difficult to obtain uniformly good results due to difficulties in measuring the charge and the volume of water for this partial volume. Further, the large size of the conventional brewer makes it relatively inconvenient to use and to maintain for such lmited use. While a number of smaller size brewers have been developed, these have had certain disadvantages such as difficulty in use and failure to provide uniformly satisfactory coffee.

It is a prime object of this invention to provide a new and improved automatic beverage brewer.

Another object is to provide such a beverage brewer having effectively optimum functioning in the preparation of a small quantity of beverage, such as one or two cups.

Still another object is to provide such a beverage brewer arranged to be placed upon a flat surface as a table to deliver brewed beverage automatically to drinking cup means placed on the table adjacent said brewer.

A further object is to provide such a brewer having new and improved means for measuring automatically charges of ground conee proper for alternative amounts of brewed coffee.

Still another object is to provide such a brewer having new and improved structure for providing properly heated water to the brewing chamber.

A yet further object is to provide such a brewer having a new and improved brewing chamber structure.

Yet another object is to provide such a brewer having new and improved means for filtering the brewed coffee.

A further object is to provide such a brewer having new and improved spout means.

Other features and advantages of the invention will be apparent from the following description taken in connection with the accompanying drawings wherein:

FIG. 4 is a vertical section of the brewer taken approximately along the line 4—4 of FIG. 1;

FIG. 5 is a fragmentary sectional view thereof with the distributor plate in an arrangement differing from that shown in FIG. 4;

FIG. 6 is a horizontal section taken approximately along the line 6—6 of FIG. 4;

FIG. 7 is a side elevation of the brewer with the handle arranged for carrying the body and base while permitting removal of the brewing chamber and spout, a portion of the handle being shown in dotted lines indicating the movement thereof from a posiiton of FIG. 4 to the full line position of FIG. 7;

FIG. 8 is a fragmentary horizontal section of the base taken approximately along the line 8—8 of FIG. 4;

FIG. 9 is an enlarged, fragmentary vertical section showing the connection between the handle and the cover;

FIG. 10 is a vertical section taken approximately along the line 10—10 of FIG. 9; and FIG. 11 is a fragmentary rear elevation of the handle portion engaging the retaining means on the base.

Figure 1:
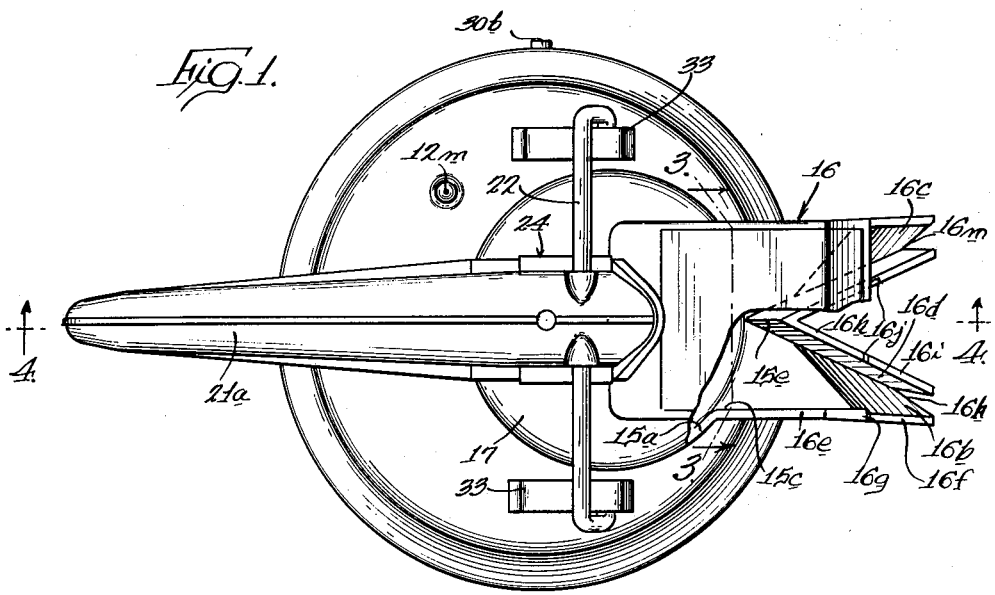
FIG. 1 is a top plan view of a coffee brewer embodying the invention, with a portion of the spout means broken away.

In the exemplary embodiment of the invention, as disclosed in the drawings, a new and improved automatic coffee brewer is shown to comprise a base 10 housing automatic control means generally designated 11 and carrying a body, or container, 12 adapted to receive a quantity of water (not shown) to be heated by heating means in the bottom thereof. Extending downwardly into body 12 is a cup member, or brewing receptacle, 13 having a lower, charge holder portion 14 received within body 12 and an outer, filter chamber portion 15 from one side of which extends a downwardly directed spout means 16. A cover 17 extends over the top of cup member 13 and is provided with a canopy portion 18 which extends over the spout means 16. A filter 19 is disposed across the upper end of charge holder portion 14 of the cup member by means of a filter frame 20 which is secured to the underside of cover 17.

A handle 21 is connected to body 12 by means of a bail 22 which permits an alternative disposition of the handle partially over cover 13 in an assembly securing position and laterally thereof in an assembly released position. Secured to one end of the handle is a spring arm 23 which engages the top of cover 17, when the handle is in securing position, and thereby retains the cover on cup member 13 and, in turn, cup member 13 on body 12. To maintain the handle and spring in this relationship with the cover, a latch 24 is provided on the handle engaging a suitable catch means 25 on the cover. To secure the handle in the released position laterally of cup member 13, a catch 26 is provided on base 10 for engagement with a complementary end 27 of handle 21. With the handle in this released position, cup member 13 may be readily removed for maintenance and recharging and the proper quantity of water may be placed in body 12 for a subsequent brewing operation.

The general structure of the automatic coffee brewer having been described, the detailed structure of the individual elements thereof which combine to provide a novel, improved automatic functioning theerof will be considered. As best seen in FIGS. 4 and 8, base 10 comprises a generally circular lower portion 10a, an annular upper portion 10b, and a cylindrical wall member 10c therebetween. As may best be seen in FIG. 4, lower portion 10a may be provided with a plurality of downwardly extending legs 10d for supporting the brewer on a horizontal surface (not shown).

Body 12 comprises a hollow member having a cylindrical side wall 12a and a top wall 12b. The lower end of body 12 is closed by a bottom member 12c preferably formed of a material having a high coefficient of thermal conduction, such as aluminum. Bottom member 12c is provided with a peripheral flange 12d and the lower end 12e of side wall 12a is formed around the bottom of the flange to secure the side wall to the bottom member. To seal the side wall to the bottom member, an O-ring 12f is mounted on flange 12d to extend outwardly into sealing engagement with the side wall.

Inwardly of flange 12d, bottom 12c is provided with an annular boss 12g depending somewhat into the interior of base 10. An annular heater rod 28 is disposed within boss 12g, the ends 28a and 28a' of which are brought up through a pair of vertically depending posts 12h at the circumferentially adjacent ends of the annular boss 12g.

As alluded to briefly above, the means 11 for automatically energizing heater 28 is disposed within base 10. As best seen in FIGS. 4 and 8, upper portion 10b of the base is provided at one point with a recessed wall 10d. Extending outwardly through wall 10d is a pair of electrical prong elements 11a and 11a' adapted to be engaged by a suitable female plug of a power cord of conventional construction (not shown). Base portion 10b may be formed of an insulating material such as a phenolic plastic and prongs 11a and 11a' may extend directly through recess wall 10d. As best seen in FIG. 8, prong 11a is connected directly to end 28a of heater 28 by a suitable wire conductor 11b. Prong 11a' is connected to the other end 28a' of the heater through a thermostat switch 29. Switch 29 comprises an insulating support 29a having one terminal 29b connected to prong 11a' by means of a wire 11c, and a second terminal 29c connected to end 28a' of the heater by means of a wire 11d. A first contact 29d is carried on a spring support 29e secured to support 29a in electrical conductive relationship with terminal 29b. A bimetallic strip 29f is secured to supports 29a and is provided with a bearing element 29g arranged to bear against spring support 29e. A second contact 29h is carried on a second spring support 29i which is secured to support 29a in electrical conductive relationship with terminal 29c. Spring support 29i is provided with a bowed mid-portion 29j which provides a toggle action on spring support 29i to throw it positively to either side of a center position. In FIG. 8, spring support 29i is overcentered toward spring support 29e thus causing contact 29h to have electrical conductive engagement with contact 29b. However, when bimetallic strip 29f is heated, the strip bends toward spring support 29e causing bearing element 29g to push against the outer end of spring support 29e and, through contacts 29d and 29h, force the outer end of spring support 29i in the opposite direction. Once spring support 29i passes its center position, the toggle action of bowed portion 29j causes the outer end carrying contact 29h to snap away from contact 29d thereby breaking the electrical connection therebetween.

Once spring support 29i is thrown to this latter overcentered position wherein contacts 29d and 29h are separated, it will remain in this position notwithstanding a return of bimetallic strip 29f to the cooled position shown in FIG. 8. Manually operable means are provided for restoring spring support 29i to the position of FIG. 8, when it is desired to initiate a new heating cycle. For this purpose, a manually operable push button 30 is provided having a body 30a secured to side wall 10c of the base, and a button element 30b extending slidably outwardly therethrough. A bar 29k is secured to one end of support 29a and a slide 30c extends through bar 29k and a ferrule 30d secured thereto to have an inner end 30e exposed between the bar and spring support 29i. A coil spring 30f extends around slide 30c between the outer end of bar 29k and button element 30b to bias the button element outwardly through side wall 10c of the base. A flat spring 29m is secured to support 29a to extend to adjacent slide 30c and urge the slide outwardly through bar 29k. Thus, inner end 30e is normally disposed adjacent bar 29k to have substantial clearance with spring support 29i. When spring support 29i is thrown to separate contacts 29d and 29h, it is moved into engagement with end 30e. Thus, subsequent to a return of bimetallic strip 29f to the cooled position of FIG. 8, it is possible to initiate a new heating cycle merely by pressing button element 30b inwardly to cause slide 30c to move inwardly through bar 29k until end 30e of the slide pushes the outer end of spring support 29i inwardly beyond the center position thereof whereupon the toggle action of bowed portion 29m causes the spring support 29i to snap to the closed position wherein contacts 29h and 29d are connected (as seen in FIG. 8).

To adjust the center position of spring support 29i, an adjusting screw 29n is threadedly mounted on bar 29k to have engagement with bowed portion 29j. Thus, the maximum deflection of bimetallic strip 29f and, correspondingly, the temperature of the heating means, may be readily controlled by adjusting the point at which the bimetallic strip effects the transfer of support 29i from the closed position to the opened position.

Button element 30b is further arranged to serve as an indicating means for indicating the energization of heater 28. Thus, as best seen in FIG. 8, button element 30b comprises a hollow transparent plastic member and a lamp 30g, such as a neon glow lamp, is disposed therein. One lead 30h of the lamp is connected to heater end 28a and the other lead 30i of the lamp is connected through a current limiting resistor 30j to terminal 29c of switch 29. Thus, the lamp is connected in parallel with the heater 28 and is illuminated whenever the heater is energized. To facilitate the installation of lamp 30g in button element 30b, the inner lead 30h of the button is radially enlarged and provided with transverse grooves 30m closed after the leads are extended therethrough by means of a plate 30n secured to the button as by rivets 30p.

As discussed above, body 12 comprises the container in which the water is heated to the proper brewing temperature. Introduction of the water into body 12 is effected through an opening 12b' in top wall 12b thereof defined by an upstanding annular flange 12i. The uppermost tip 12j of flange 12i defines a circle lying in a plane slightly skewed to the horizontal. Referring to FIG. 4 of the drawings, the plane of tip 12j is preferably one extending perpendicular to the plane of the paper and at a slight angle, such as two degrees, downwardly toward spout 16. To permit discharge of expanded air and occluded gases from body 12 during the heating of the water therein, a small vent opening 12m is provided in top wall 12b. When the water reaches the boiling point, the evolution of steam is so rapid that the small size of opening 12m so limits discharge therethrough to cause substantially all of the boiling water to pass upwardly into cup member 13.

When the proper amount of water is placed in body 12, cup member 13, which as defined above comprises the brewing receptacle, is installed on the body with the charge holding portion 14 thereof extending inwardly through opening 12a'. Filter chamber portion 15 of the cup member is radially larger than the charge holding portion 14 and is connected thereto by means of a transversely extending shoulder 13a. The underside of shoulder 13a is provided with an annular recess 13b in which is received a resilient gasket 13c for sealing cup member to flange 12i.

Charge holding portion 14 of the cup member is provided with a slightly frusto-conical side wall 14a facilitating the introduction of the charge holding portion into body 12. Extending through the bottom 14b of the charge holder, is a delivery tube 14c which, as seen in FIG. 4, may be formed integrally with the bottom. The lower end 14d of the delivery tube is cut off at an angle of approximately fifteen degrees to prevent the possibility of a closing off of the tube by a flush abutment of the tube end with the bottom member 12c. To facilitate the removal of substantially all of the water from body 12, the bottom is arranged to extend generally in a plane inclined at a small angle such as two degrees from the horizontal, extending downwardly to the right as seen in FIG. 4. Thus, the last portion of the water within the body as it is delivered therefrom into cup member 13 tends to collect adjacent the front (the right-hand side of the body as seen in FIG. 4). To further facilitate the removal of substantially all of the water from body 12, bottom 12c is further provided with a well 12h comprising the lowest portion of the bottom and into which lower end 14d of the delivery tube extends.

The upper end 14e of the delivery tube extends to substantially above bottom 14b of the charge holder. Normally, substantially all of the water in body 12 is forced outwardly therefrom through delivery tube 14c, upwardly through the charge holder portion 14 and filter chamber portion 15 of the cup member and outwardly through the spout means 16 by the steam pressure built up within the body member. However, a small amount of liquid, such as condensed steam, may remain within the cup member subsequent to the energization of the heating coil 28, and this liquid tends to run back down into the bottom of the cup member. The upward extension of delivery tube end 14e above bottom 14b precludes the passage of this liquid back through the delivery tube into body 12.

Charge holder portion 14 is arranged to perform an automatic charge measuring function. For this purpose, the internal volume of charge holder portion 14 is made to be substantialy equal to the volume of ground coffee necessary to provide two cups of properly brewed coffee. A novel distributor plate 31 is disposed in charge holder 14 adjacent bottom 14b which, in addition to effecting an even distribution of the heated water through the coffee grounds charge in charge holder 14, provides for automatic adjustment of the charge holding volume of charge holder 14 so that alternative automatic measurements of the ground coffee charges proper for one or two cups of brewed coffee may be made. Distributor plate 31 comprises a perforated disc closely fitting side wall 14a of the charge holder. A double-headed rod 31a is passed slidably through the center of plate 31 to project upwardly into the center of charge holder 14 and serve as a handle for use in removing the distributor plate from the interior of the charge holder when desired. One side of the distributor plate is provided with a plurality of small projections 31b which serve to space the distributor plate slightly above bottom 14b of the cup member permitting water to flow from end 14e of the delivery tube under substantially the entire distributor plate so that it may be evenly distributed by the distributor plate upwardly through the coffee grounds charge. Extending from the opposite side of the distributor plate is a cylindrical well portion 31c arranged to provide a free space 31d around upper end 14e of the delivery tube so that the water may be delivered freely from the delivery tube into the bottom of the cup member. The volume of space 31d is relatively small; thus, the volume of the charge holder portion 14 above the distributor plate is substantially equal to the entire volume of charge holder 14 when the distributor plate is arranged, as seen in FIG. 4, with well 31c uppermost. Thus, with distributor plate 31 so arranged, a ground coffee charge completely filling the charge holder portion 14 above the distributor plate is proper for an optimum preparation of two cups of coffee.

As best seen in FIG. 5, the side of distributor plate 31 from which well 31c extends is provided also with an annular support 31d having a plurality of legs 31e. The extension of legs 31e away from plate 31 is comparable to the depth of well 31c. Thus, when distributor plate 31 is positioned reversely from the position of FIG. 4 (as seen in FIG. 5), legs 31e rest on bottom 14b of the cup member to support the distributor plate 31 at a distance above bottom 14b and above upper end 14e of the delivery tube. It should be noted that in this arrangement of the distributor plate, well 31c also serves to support the plate, as it also abuts bottom 14b although opening upwardly away therefrom. As seen in FIG. 5, the charge holding volume of charge holder 14 is that portion above distributor plate 31 when the distributor plate is arranged with legs 31e extending downwardly. This reduced charge holding volume is equal to the volume of ground coffee necessary to provide an optimum preparation of one cup of brewed coffee, and thus the reversal of the positioning of distributor plate 31 effects an alternative arrangement of the interior of the charge holder portion 14 for optimum preparation of either one or two cups of coffee.

It should be noted that both well means 31c and support 31d, as well as the circular portion 31f of the distributor plate within annular support 31d are imperforate. Thus, these portions of the distributor plate baffle the incoming hot water in a relatively circuitous path so that the velocity energy of the incoming water is substantially dissipated before the water is allowed to pass through the perforated plate upwardly into the charge.

Filter chamber portion 15 of the cup member comprises an annular wall 15a upstanding from shoulder 13a. The inner wall surface 15b is frusto-conically tapered at a small angle, such as two degrees, to facilitate the insertion of filter frame 20 therewithin. Wall 15a is turned outwardly at the front of filter chamber portion 15 and is continued therefrom to define the outer side walls 16a of a bifurcated spout means 16. The opening 15c between the outturned portions of wall 15a comprises an outlet from the filter chamber through which the brewed coffee passes into spout 16.

The upper surface 13d of shoulder 13a between the charge holder 14 and filter chamber 15 of the cup member is frusto-conically inclined at a small angle, such as four degrees, to a radial plane of the cup member. Further, the outer (uppermost) portion 13e of surface 13d is arranged to lie in a plane inclined at a small angle, such as one degree, to the radial plane and extending downwardly to the right as seen in FIG. 4. Thus, because of the cumulative effect of the inclination of the outer tip 12j of body flange 12i and the inclination of the outer portion 13e of the shoulder 13d the radially outer portion of the filter chamber at opening 15c is approximately three degrees lower than a diametrically opposite point thereof.

Figure 2:
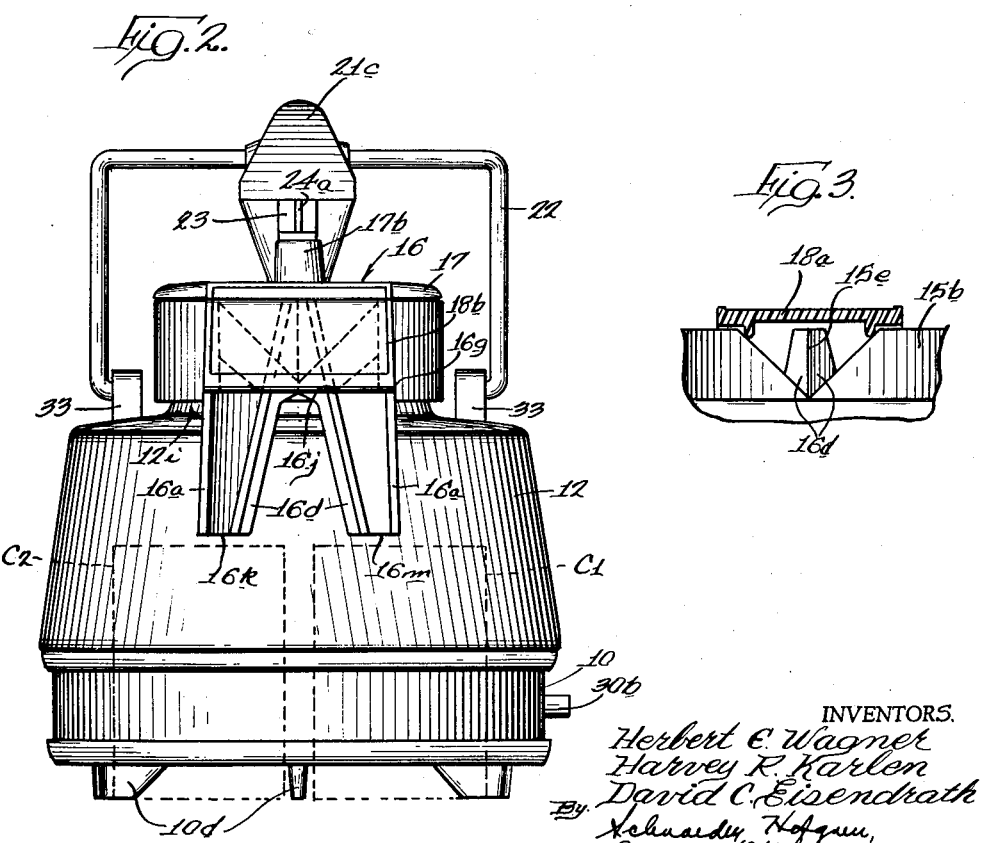
FIG. 2 is a front elevation thereof.
Figure 3:
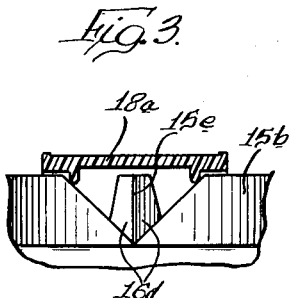
FIG. 3 is a fragmentary vertical section of the spout means taken approximately along the line 3—3 of FIG. 1.

As best seen in FIGS. 1 and 2, spout means 16 is bifurcated, forming effectively two spouts, namely, spout 16b and spout 16c. As discussed briefly above, the outer side walls 16a of the spouts are defined by continuations of the filter chamber wall 15a. The inner side walls 16d of the spouts extend angularly outwardly and downwardly from a juncture 15e at the center of opening 15c in the filter chamber wall. Juncture 15e comprises a knife edge extending angularly upwardly and outwardly from shoulder outer portion 13e, at an angle of approximately sixteen degrees to the axis of the cup member. Each of side walls 16a comprises an upper, generally horizontally extending portion 16e and a lower, downwardly extending portion 16f, extending at approximately a thirty degree angle relative to the axis of the cup member. The outer edge of lower portion 16f is provided with a notch 16g extending downwardly from the upper portion 16e to a point laterally of the bottom of discharge opening 15c. Inner side walls 16d are similarly comprised of an upper, generally horizontal portion 16h and a lower portion 16i extending downwardly at an angle of approximately thirty degrees to the axis of the cup member. Lower wall portion 16i is provided with a notch 16j laterally aligned with notch 16g of the outer side walls. The lower end 16k of spout 16b and the lower end 16m of spout 16c are disposed at a substantially lower level than the level of outlet opening 13c of the cup member, so that the brewed coffee may be directed directly into a suitable container or receptacle such as a drinking cup while precluding inadvertent splashing of the brewed coffee from the drinking cup.

Each of the side wall portions comprises a substantially flat wall section. The confronting side walls of each spout are inclined to define troughs having a generally triangular cross section wherein the inner side walls extend generally vertically and the outer side walls are substantially inclined thereto. The angular arrangement of the side wall portions defining the two spouts is such that the lower ends 16k and 16m are spaced apart a substantial distance, which distance, however, is preferably no greater than the internal diameter of the conventional receptacle such as a drinking cup. In the illustrated embodiment, this spacing is approximately 1¼".

As discussed above, the upper end of cup member 13 is closed by a cover 17. Cover 17 is disc-like and is provided with a depending annular flange 17a adapted to fit loosely within the upper end of side wall 15a of the charge holder 14 to preclude inadvertent lateral translation of the cover. Canopy 18 extends laterally from the front of the cover 17 to overlie the upper portion of the spout means. Canopy 18 comprises a generally horizontal portion 18a extending between upper side wall portions 16e of the outer side wall and upper portion 16h of the inner side wall, and an angularly depending portion 18b extending between lower portion 16f of the outer side wall and lower portion 16i of the inner side wall to be received in notches 16g and 16j thereof. This protective covering of the upper portion of spout means 16 precludes splashing of the brewed coffee outwardly from the upper portion of the spout means, such as might otherwise occur due to the forceful movement and bubbling action of the brewed coffee as it passes from the cup member.

Filter 19 comprises a sheet of suitable filter material, such as cloth, secured across a lower, annular support 20a of filter frame 20. Support 20a is secured to a circular mounting plate 20b of the filter frame by means of a plurality of spaced arms 20c which are long enough to space support portion 20b a small distance upwardly from the cup member when the annular portion is resting on shoulder 13d thereof. Support 20b is secured to the underside of cover 17 centrally thereof by means of a bolt 32 mounted in an upstanding boss 17b of the cover. A nut 32a is threaded to the inner end of bolt 32 to retain filter frame 20 removably to the cover.

The outer diameter of annular support 20a of the filter frame is preferably comparable to the diameter of outer portion 13e of the shoulder so that when the filter frame, with filter sheet 19 attached thereto, engages the shoulder, it does so at the radially outer portion 13e. As the surface of shoulder 13d is frusto-conical, the shoulder slopes away from the filter sheet 19 permitting substantially the entire space of the filter sheet to be exposed to the liquid within the charge holder portion 14 of the cup member thereby maximizing the effective filter area.

Handle 21 is arranged to permit the carrying of the assembly of base 10 and body 12 with or without cup member 13 and cover 17 installed thereon. Further, handle 21 is provided with means for retaining the cover 17 and cup member 13 in place on the body 12 when desired. Still further, handle 21 is provided with means for controlling the pressure within body 12, permitting relief thereof should the pressure exceed a safe predetermined limit, or permitting regulation of the pressure to a predetermined optimum brewing pressure, as desired. The novel structure providing these desirable features is best seen in FIGS. 1, 2, 7 and 9 through 11, wherein the handle is seen to comprise a grasping portion 21a and a hook portion 21b. End 21c of grasping portion 21a is pivotally connected to a pair of brackets 33 on top wall 12b of body 12 by a U-shaped bail 22. Brackets 33 are disposed on opposite sides of opening 12a', each bracket being provided with an elongated slot 33a extending upwardly at a small angle, such as five degrees, toward the front of body 12 (to the right as seen in FIG. 7). As best seen in FIG. 10, the mid-portion of bail 22 is provided with an annular enlargement 22a which is received in a semicylindrical portion 21d of a recess 21e provided in end 21c of the handle and a complementary cylindrical recess 34a in an insert 34 received in the recess 21e of the handle. Securing means, such as bolt 34b and nut 34c, are provided to secure the insert 34 removably in recess 21e.

As discussed above, spring arm 23 is secured to end 21c of the handle to engage cover 17. As best seen in FIGS. 9 and 10, the spring arm comprises a U-shaped leaf spring having a turned end 23a engaging a recess 17c in the upper surface of boss 17b. The other end of the spring arm is provided with a pair of semicylindrically curved fingers 23b hooking around the bail on opposite sides of the enlarged bail portion 22a in recess portions 21d and 34a of the handle and inserts, respectively.

To maintain the handle in the assembly securing position of FIGS. 4 and 9, latch 24 is provided to have releasable engagement with catch 25 on cover 17. Latch 24 comprises a hook 24a depending from a slide plate 24b slidably channelled on laterally enlarged side portions 34c of insert 34. The bottom of the insert is provided with a pair of spaced, elongated grooves 34d extending longitudinally of the handle, in each of which grooves is received a coil spring 24c. Slide plate 24b underlies each of the grooves and at the portion thereof subjacent the end of the grooves closest to end 21c of the handle, the slide plate is provided with a pair of upstanding tabs 24d against which springs 24c abut. Thus, plate 24b is urged to the right (as seen in FIG. 9) by said springs and hook portion 24a is biased into latched relationship with catch 25. As best seen in FIG. 9, catch 25 comprises the head of bolt 32 which is the bolt retaining the filter frame on cover 17.

Referring now more specifically to FIGS. 7 and 11, the opposite end 27 of handle 21 may be seen to comprise a pair of laterally extending ears arranged to engage overhanging catch 26 on upper portion 10b of the base directly above recess portion 10d thereof in the released position. When ears 27 are hooked under catch 26, upward movement of the handle grasping portion is precluded by bail 22. Thus, the handle is securely retained so that the assembly of base 10 and body 12 may be carried for such purposes as filling the body with a supply of water to be heated.

To utilize the instant coffee brewer, handle 21 is swung upwardly to slightly beyond the position shown in dotted lines in FIG. 7, thereby permitting the removal of cup member 13 with cover 17 thereon from the body 12. The handle is then concurrently swung downwardly and the bail is moved rearwardly in slots 33a of the brackets 33 until ears 27 of the handle are hooked under catch 26 on the base, the bail then being positioned at the rearward end of slot 33a. To prepare two cups of coffee with the brewer, two cups of water are poured into the interior of body 12, handle 21 being fixedly disposed in the above described position so that the body and base assembly may be carried over to a suitable water supply means such as a kitchen faucet or the like.

Cover 17 is removed from cup member 13 and, with distributor plate 31 installed in the position of FIG. 4, the charge holder portion 14 is filled with ground coffee. Cover 17 is then replaced over cup member 13 so that filter 19 peripherally engages the outer portion 13e of cup member shoulder 13d. This automatically arranges canopy 18 of the cover over the upper portion of spout means 16 with the downwardly extending portion 18b of the canopy received in the notches 16g and 16j of the spout side walls. Cup member 13 is then installed on body 12 by inserting the charge holder portion 14 through opening 12a' until gasket 13c rests on flange 12i. This properly disposes the lower end 14d of the delivery tube within well 12h of the body bottom and provides a forward cant of the cup member to facilitate the proper dispensing of the brewed coffee therefrom through spout means 16.

Handle 21 is now moved from the position of FIG. 7 by a slight downward movement disengaging ears 27 of the handle from catch 26, permitting the handle to be swung and bail 22 to slide forwardly in slots 33a to approximately the position shown in dotted lines in FIG. 7. With bail 22 maintained substantially in the position shown in dotted lines in FIG. 7, the handle is swung in a counterclockwise direction causing end 23a of the spring arm to engage forcibly the cover in recess 17c of the cover boss. Pivoting of the handle is continued until the handle reaches the position of FIG. 4, whereupon latch 24a automatically hooks under catch 25 and end 27 of the handle bears against side wall 12a of the body locking the handle in the assembly securing position. In this position, spring arm 23 is flexed somewhat from its natural arrangement so that it exerts a predetermined pressure downwardly on cover 17. This pressure force is, in turn, transmitted from the cover through the filter frame 20 and filter 19 carried thereon against shoulder 13d of the cup member. This, in turn, causes the cup member to be urged downwardly so that it is sealed to flange 12i of the body by means of the gasket 13c.

Manual push button 30 is now depressed to cause end 30e of the slide to move spring support 29i to the over-centered position in which contact 29h thereon engages contact 29d and completes the circuit to the heater rod 28. The water in body 12 rises in temperature until it reaches the boiling point, whereupon the steam pressure within body 12 causes the water to pass upwardly through delivery tube 14c into the bottom of the charge holder portion 14 of cup member 13. After substantially all of the water is thus removed from the body 12, the temperature of bottom 12c rapidly rises to actuate bimetallic strip 29f so as to flex it and cause bearing element 29g to force both spring support 29e and 29i toward bar 29k until spring support 29i passes the center position and snaps away from spring support 29e, whereupon contacts 29d and 29h are separated to open the circuit to the heating coil.

When the heated water in body 12 is forced upwardly through delivery tube 14c, it passes therefrom to the bottom of the charge holder portion 14 and thence upwardly through the perforate distributor plate 31 through the ground coffee charge carried thereon whereupon a proper brewing of the coffee occurs. The steam pressure in body 12 causes the liquid to continue to rise in cup member 13 until the brewed coffee is forced through filter 19 into filter chamber 15, whereupon it flows outwardly through opening 15c in the side wall 15b thereof. Should the steam pressure within body 12 exceed the predetermined value allowed by spring arm 23, it will exert a force on the bottom 14b of the cup member which acts in opposition to spring arm 23 and, thus, will cause the cup member to rise slightly above flange 12i, whereupon the excess pressure is immediately relieved. Thus, spring arm 23 serves as an automatic pressure control or relief means, as desired.

As the coffee is forced upwardly through filter 19, it is moving turbulently. Canopy 18, however, precludes any undesired splashing of the coffee from opening 15c and causes it to flow properly outwardly through each of spouts 16b and 16c. As each of the spouts joins at a knife edge 15e disposed at the center of opening 15c, an exactly equal amount of coffee is dispensed through each of the spouts. Thus, a full cup of coffee is dispensed automatically to each of two separate cups (C1 and C2), one of which may be disposed to extend upwardly from the plane of the bottom of legs 10d under spout 16b and the other of which may be disposed under spout 16c. The brewing cycle is now completed and the brewer is ready for a subsequent similar brewing operation.

When only one cup of coffee is desired, the same procedure as described above is followed except that distributor plate 31 is disposed in charge holder portion 14 of the cup member in the inverted position as seen in FIG. 5 and only one cup of water is placed in body 12. The drinking cup into which the coffee is to be dispensed is placed so that both spouts 16b and 16c are directed thereinto. The heating of the water and the brewing of the coffee takes place as before, but now the coffee is dispensed through each of the spouts into the single drinking cup.

While we have shown and described certain embodiments of our invention, it is to be understood that it is capable of many modifications. Changes, therefore, in the construction and arrangement may be made without departing from the spirit and scope of the invention as defined in the appended claims.

We claim:

1. In a beverage brewer having a charge holding receptacle provided with a bottom and an inlet duct extending to above the bottom, means for gauging the charge of beverage ingredient proper for each of a plurality of beverage quantities, comprising a foraminous plate extending removably horizontally across the receptacle and having a pair of tubular bosses projecting therefrom in one direction from the flat plane thereof for spacing the plate a predetermined distance above the bottom of the receptacle in one position wherein the bosses extend downwardly from said plate and the inlet duct extends into the distal end of one of said bosses whereby the charge receiving volume of the receptacle above the plate is proper for preparation of a first predetermined quantity of beverage, said plate having an opening aligned with the other of said bosses for passage of the inlet duct therethrough and into the space defined by said other boss whereby the plate may be disposed at the bottom of the receptacle in a reversely turned second position wherein the bosses extend upwardly from said plate whereby the charge receiving volume of the receptacle above the plate is proper for preparation of a second, predetermined greater quantity of beverage.

2. The beverage brewer of claim 1 wherein an imperforate wall extends across the one boss at the distal end thereof spaced from the plate.

3. The beverage brewer of claim 1 wherein the plate is provided with a plurality of lugs projecting from the flat plane oppositely from said bosses to support the plate a small distance above the bottom of the receptacle in the second position.

4. Beverage brewing means comprising: a container having a top; means associated with the container for heating liquid in the container; a brewing receptacle carried by said top and extending to within the container, said brewing receptacle having an open top and a discharge opening at said top; means to conduct liquid from the container into the bottom of the brewing receptacle as an incident to the development of pressure in the container arising from the heating of the liquid therein; means in the brewing receptacle for carrying a beverage ingredient charge permitting passage of heated liquid upwardly through the charge; means operatively associated with the container removably retaining the brewing receptacle in sealed association with the container top; and spout means associated with the brewing receptacle for directing the beverage as it is dispensed from the brewing receptacle into two streams spaced for selective delivery concurrently into a single receiving element such as a conventional drinking cup and individually into a pair of receiving elements such as a pair of conventional drinking cups, including a pair of planar walls symmetrically converging at a line in a vertical plane bisecting said discharge opening, first wall means extending laterally from one of said walls to define therewith a first flow passage, and second wall means oppositely of said first wall means and extending laterally from the other of said walls to define therewith a second passage, said passages diverging downwardly at a small angle whereby the ends of the flow passages most remote from said brewing receptacle are spaced apart a substantial distance and less than the maximum transverse dimension of the conventional drinking cup.

5. Beverage brewing means comprising: a container having a top provided with an opening; means associated with the container for heating liquid in the container; a brewing receptacle carried by said top and sealed thereto around said opening, said brewing receptacle having a charge holding portion terminating upwardly in an annular flange having a varying vertical thickness defined by a substantially frusto-conical upper surface sloping upwardly away from the axis of the receptacle; a duct in the container communicating at its upper end with the bottom of the charge holding portion of the brewing receptacle and at its lower end with the bottom of the container to conduct liquid from the interior of the container into the brewing receptacle as an incident to the development of pressure in the container arising from the heating of the liquid therein; means for filtering a beverage resulting from the passage of hot liquid through the charge including a filter across the upper end of the charge holding portion and peripherally engaging said flange along an upper, outer annular portion of said upper surface for filtering liquid passing upwardly from said charge holding portion across the area circumscribed by the outer annular portion, said filter being inclined downwardly toward the portion of the flange having minimum thickness; annular means operatively associated with the container coaxially subjacent said flange for removably retaining the brewing receptacle in sealed association with the container and the filter across said upper end of the charge holding portion; and spout means opening into the brewing receptacle at the portion thereof whereat the flange has minimum thickness for directing the beverage as it is dispensed from the brewing receptacle.

6. The beverage brewing means of claim 5 wherein the brewing receptacle is provided with an upstanding rim wall having a discharge opening adjacent the portion of the flange having minimum thickness, said means for directing the beverage being at said discharge opening, whereby beverage is caused to flow over said filter toward said discharge opening when the brewing receptacle is in place on the container top.

7. In a beverage brewer, a tubular brewing receptacle having a transverse bottom wall, a charge holding portion extending upwardly from said wall to an upper end, an annular flange at said upper end, said flange having a varying vertical thickness defined by a substantially frusto-conical upper surface sloping upwardly away from the axis of the receptacle, means for introducing liquid into said charge holding portion, a filter across said upper end having a planar bottom surface engaging a radially outer annular portion of said flange along substantially the entire length thereof and extending at an angle less than 90° to the axis of the receptacle for filtering liquid passing upwardly from said charge holding portion across substantially the entire area circumscribed by said outer annular portion, and annular means sealingly supporting the receptacle coaxially subjacent said flange.

8. The beverage brewer of claim 1 wherein said one boss is provided with a lateral opening adjacent the distal end thereof for passage of fluid from the space within said one boss to under said plate.

References Cited in the file of this patent

UNITED STATES PATENTS

| | | |
|---|---|---|
| Re. 19,566 | Valls | May 7, 1935 |
| 203,179 | Miller | Apr. 30, 1878 |
| 978,516 | Walton | Mar. 21, 1911 |
| 1,035,099 | Paone | Aug. 6, 1912 |
| 1,171,022 | Ciletti | Feb. 8, 1916 |
| 1,978,561 | Battilani | Oct. 30, 1934 |
| 2,099,292 | Brown | Nov. 16, 1937 |
| 2,103,780 | Hadley | Dec. 28, 1937 |
| 2,151,407 | Lobl | Mar. 21, 1939 |
| 2,554,367 | Karlen | May 22, 1951 |
| 2,567,027 | Peters | Sept. 4, 1951 |
| 2,620,088 | Tellander | Dec. 2, 1952 |
| 2,658,134 | Kircher | Nov. 3, 1953 |
| 2,666,128 | Crawford et al. | Jan. 12, 1954 |
| 2,705,095 | Neuman | Mar. 29, 1955 |

FOREIGN PATENTS

| | | |
|---|---|---|
| 451,675 | Italy | Sept. 23, 1949 |
| 557,772 | Italy | Feb. 20, 1957 |